Oct. 6, 1925.

H. M. PATCH 1,556,158

HEADLIGHT LENS

Original Filed Nov. 9, 1920   2 Sheets-Sheet 1

INVENTOR:
Harry M. Patch
BY
Pierre Barnes
ATTORNEY

Oct. 6, 1925. 1,556,158
H. M. PATCH
HEADLIGHT LENS
Original Filed Nov. 9, 1920  2 Sheets-Sheet 2
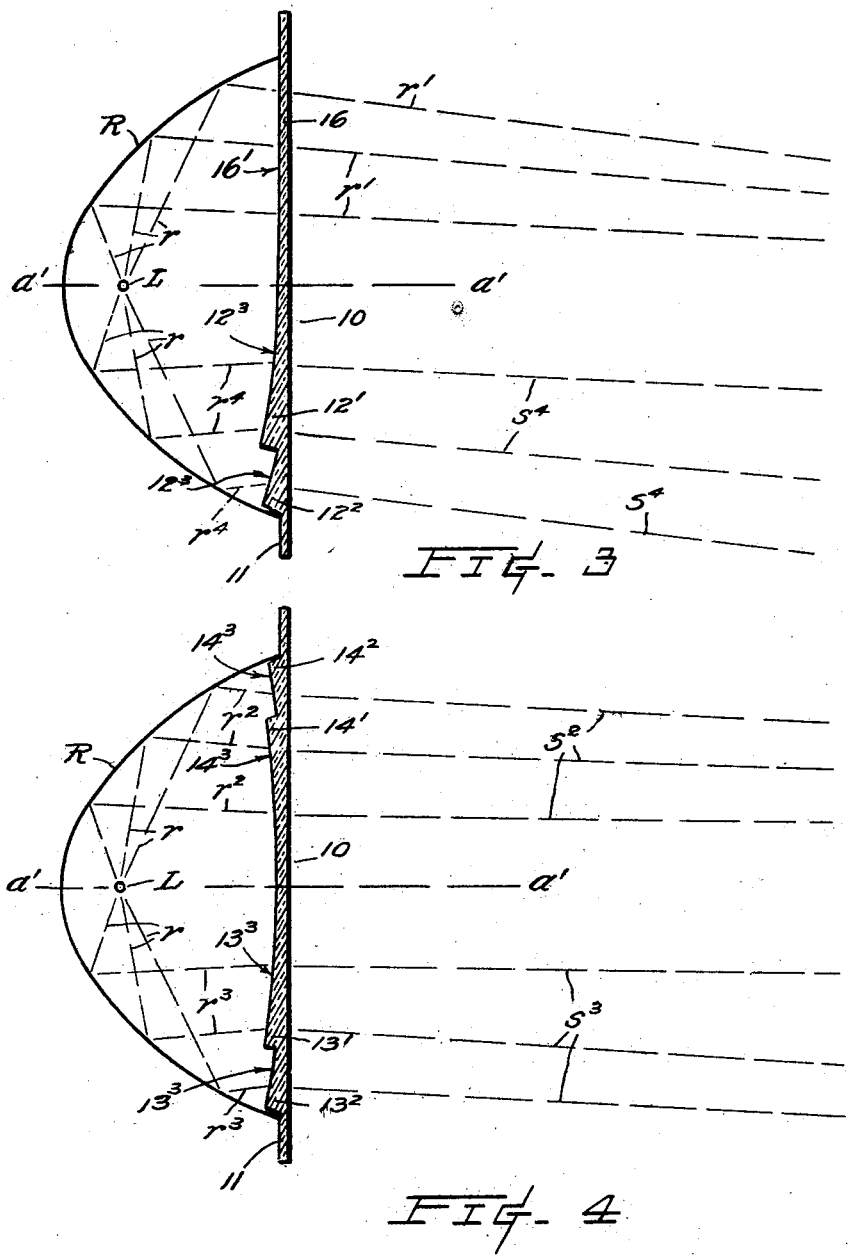

Patented Oct. 6, 1925.

1,556,158

UNITED STATES PATENT OFFICE.

HARRY M. PATCH, OF SEATTLE, WASHINGTON.

HEADLIGHT LENS.

Application filed November 9, 1920, Serial No. 422,760. Renewed March 16, 1925.

*To all whom it may concern:*

Be it known that I, HARRY M. PATCH, a citizen of the United States, residing at Seattle, in the county of King and State of Washington, have invented certain new and useful Improvements in Headlight Lenses, of which the following is a specification.

This invention relates to automobile headlight lenses.

The object of the invention is to provide a lens of this character which is adapted to regulate the beam of reflected light issuing from a headlight so as to most advantageously illuminate the road bed in front of a vehicle for night driving with an absence of shafts of light which would dazzle the sight of pedestrians or the drivers of approaching vehicles.

The invention consists in the novel form, adaptation and combination of lens elements as will be hereinafter described and claimed.

Figures 1, 2:
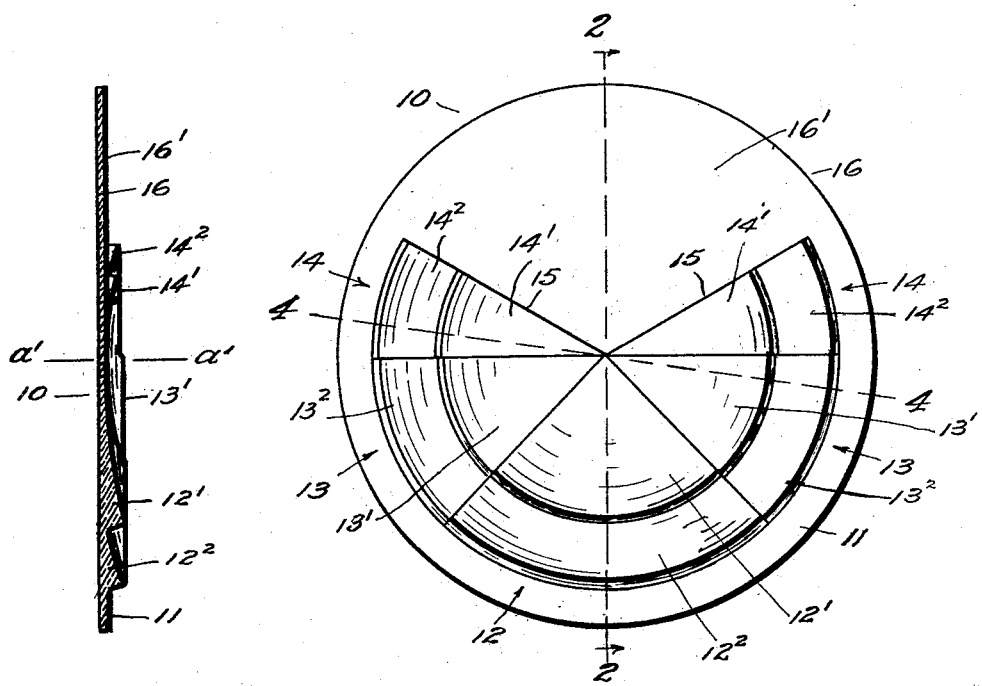
Figure 5:
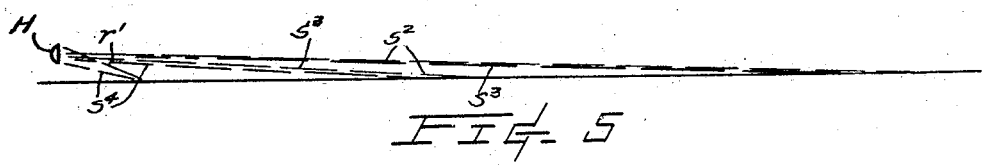
Figure 6:
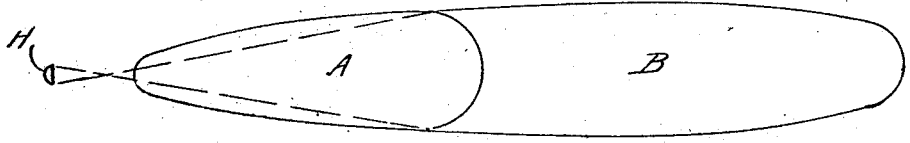

In the accompanying drawings, Figure 1 is a face view of a lens embodying the present invention in the form now preferred by me. Fig. 2 is a vertical sectional view through 2—2 of Fig. 1. Fig. 3 is a view similar to Fig. 2 with the lens shown applied. Fig. 4 is a sectional view through 4—4 of Fig. 1 with the lens applied. Fig. 5 is a diagrammatic side elevation illustrating a beam of light from a headlight provided with a lens constructed in accordance with my invention. Fig. 6 is a plan view of Fig. 5.

With automobile headlights as generally used and with reference to Figs. 3 and 4, the rays $r$ from the source of light designated by L, are reflected by the reflector R in converging rays $r^1$, $r^2$, $r^3$ and $r^4$ which cross the headlight axis—in the so called "outer focus"—at a distance in front of the vehicle. From this focus the rays diverge to produce therebeyond a light beam having a general conical form.

In such beam the rays $r^1$ reflected from the central upper portion of the reflector R serve to illuminate an area of the road in front of the vehicle. The reflected rays $r^2$ and $r^3$ from the sides of the reflector and also the rays $r^4$ from the lower portion thereof, however, are distributed laterally and upwardly to seriously affect the eyes of pedestrians and drivers of other vehicles which is extremely dangerous and a menace to night driving.

I overcome these objections by means of the following described lens.

The numeral 10 designates a circular lens preferably made of clear uncolored glass having a marginal portion 11 which is engageable by the retaining ring of a headlight casing.

As shown in Fig. 1, said lens within the marginal portion 11 is formed to provide a plurality of sectors 12, 13 and 14 which may each comprise one or more prismoidal elements.

The relative sizes, arrangement, and positions of said sectors are substantially as shown in Fig. 1—that is to say, the sector 12 occupies a position below the lens center and is flanked on each side by the sectors 13 which have their upper perimetric radii disposed in the horizontal diameter of the lens. The sectors 14 extend from such diameter into the upper half of the lens and have their perimetric radii 15 in angular relations of approximately thirty degrees with respect to such horizontal diameter.

The upper portion 16 of the lens between sectors 14 is of uniform thickness with parallel plane faces which are rectangular to the lens axis.

In the illustrated embodiment of the invention I show each of said sectors divided into two complementary elements, or prisms as hereinafter designated, which are respectively denoted by the reference characters $12^1$, $12^2$; $13^1$, $13^2$ and $14^1$, $14^2$.

Said prisms are in the nature of projections with respect to the plane of the lens face $16^1$ above and between the upper edges 15 of the prisms $14^1$ and $14^2$. The outer faces $12^3$, $13^3$ and $14^3$ of said prisms are formed to spherical surfaces generated from centers located in a line $a^1$—$a^1$ extending axially through the lens.

The radii of generation for the prisms of sectors 13 are greater than the generating radii of the sector 12, and those of sectors 14, in turn, exceed those of sectors 13 so that the light refractive properties of the various prisms will enable them to perform their intended functions as will be presently explained.

By reason of the complementary prisms being disposed in sector-like arrangement and in radial relations with respect to the lens center, the tendency of the prisms is to refract light rays passing therethrough in directions diverging from the lens axis.

The functions of the various prisms may be best explained by reference to Figs. 3 and 4. Considering first the upper plane part 16 of the lens, the converging downwardly directed rays reflected by the central upper portion of the reflector are practically unaffected in passing through the lens and continue downwardly as denoted by lines $r^1$, in Fig. 3, to the road bed at a short distance in front of the vehicle. The illumination afforded to such area, indicated by A in Fig. 6, by light rays passing through the lens part 16 is augmented by rays $r^4$ (Fig. 3) reflected by the central lower portion of the reflector being refracted by the prisms $12^1$, $12^2$ from their upward directions into downwardly extending rays $S^4$. The rays such as $r^2$ (Fig. 4) from the sides of the reflector just above its horizontal diameter are refracted divergently by the prisms $14^1$, $14^2$ into directions denoted by $S^2$ which converge to the projected axis $a^1$—$a^1$ of the lens at a short distance in front of the latter whereat the refracted rays cross such axis in a general downward direction to illuminate the road bed, as in area B, for example, in front of the area A illuminated through the instrumentality of the lens part 16 and prisms of sector 12. The prisms $14^1$ and $14^2$ it is to be noted, render the respective reflective rays $r^2$ less divergent to accordingly produce a prolonged lighted area of relatively small width.

The prisms $13^1$, $13^2$ at opposite sides of the lens center and just below the horizontal diameter thereof serve to direct the upwardly converging reflected rays $r^3$, Fig. 4, pertaining thereto into slightly diverging downward directions as $S^3$ with respect to the headlight axis $a^1$—$a^1$, for the purpose of intensifying the lighting of area B, Fig. 6. The provision for the respective prisms of concave spherical surfaces $12^3$, $13^3$ and $14^3$ is an important feature of the invention and serves to correct spherical aberrations due to the form of the headlight reflector and the position of the light source with respect thereto.

What I claim is,—

1. A headlight lens, having one of its faces formed to provide a non-prismatic surface above the center thereof, a prism above the horizontal diameter of the lens at each side of the aforesaid non-prismatic portion, a prism located below the lens center and medially of the transverse width of the lens, and a prism at each side of the last named prism and below the horizontal diameter of the lens, all of said prisms having outer concave spherical surfaces whose centers of generation are located in the axis of the lens, the prisms above the horizontal diameter serving to refract the light rays passing therethrough into converging directions axially of the lens, the prisms below the horizontal diameter serving to respectively refract to variant extents light rays passing therethrough into radially divergent directions.

2. A headlight lens which is divided circumferentially into a plane central upper portion, and a series of prismoidal projections provided on one face of the lens and occupying spaces at opposite sides of and below said plane portion, said projections having outer concave spherical surfaces and arranged with respect to the lens axis so as to refract light rays therethrough in variant radially directions with respect to the lens axis.

Signed at Seattle, Washington, this 21st day of October 1920.

HARRY M. PATCH.